A. CASAZZA.
CUSHION TIRE FOR VEHICLE WHEELS.
APPLICATION FILED SEPT. 13, 1911.
1,083,000.
Patented Dec. 30, 1913.
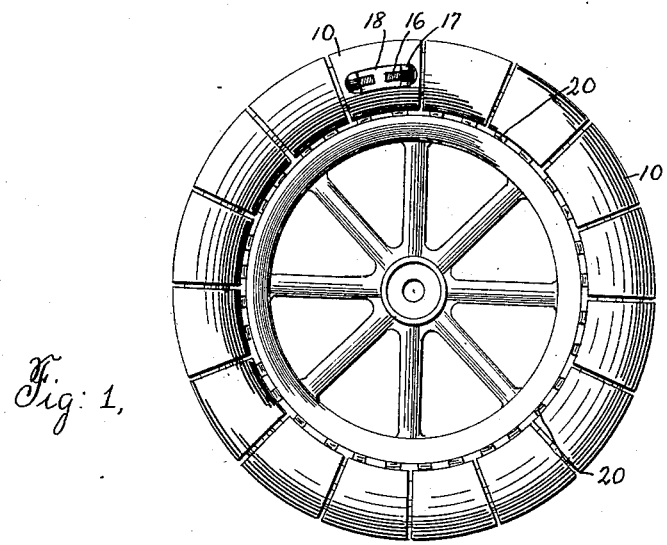
Fig: 1.
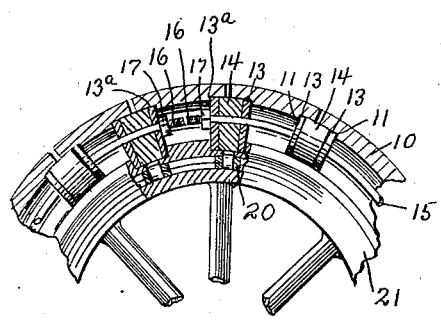
Fig: 2.
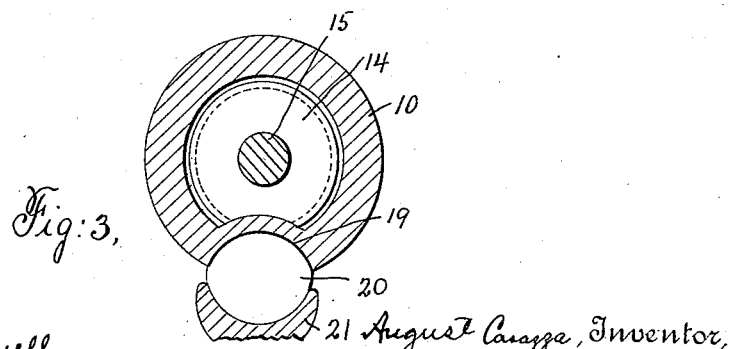
Fig: 3.

UNITED STATES PATENT OFFICE.

AUGUST CASAZZA, OF HOBOKEN, NEW JERSEY.

CUSHION-TIRE FOR VEHICLE-WHEELS.

1,083,000.      Specification of Letters Patent.      Patented Dec. 30, 1913.

Application filed September 13, 1911. Serial No. 649,208.

*To all whom it may concern:*

Be it known that I, AUGUST CASAZZA, of Hoboken, Hudson county, New Jersey, have invented a new and useful Improvement in Cushion-Tires for Vehicle-Wheels, of which the following is a full, clear, and exact description.

My invention relates to improvements in tires for vehicle wheels, and the object of my invention is to produce a simple, durable tire which is not puncturable and which is not pneumatic.

In carrying out my invention I form the tire of a series of tubular sections which abut end to end, and separate these slightly by a cushion so that when weight is applied to the tire tread it will have a tendency to force the sections together endwise, and the cushions will thus act to afford a resilient support for the weight carried by the wheel. To provide for a further cushioning effect, I arrange cushions between the several tire sections and the felly of the wheel, and thus I get cushions endwise of the sections and radially also, and in this way a very resilient and at the same time cheap and durable tire is produced.

Reference is to be had to the accompanying drawings forming a part of this specification, in which similar reference characters indicate corresponding parts in all the views.

Figure 1 is a side elevation of a tire embodying my invention, the same being shown applied to a wheel. Fig. 2 is a broken longitudinal section of the tire and wheel, and Fig. 3 is an enlarged cross section through the tire and a portion of the wheel felly.

The tire is made up of a series of tubular sections 10 which meet end to end, and which can be of any desired length. These are preferably of aluminum, but can be of any other suitable metal such as steel, iron, copper, or the like. On the inner side and near the end of each section is a shoulder 11 against which is placed a metallic washer 13, and cushions 14, preferably in the form of rubber cylinders, abut with each washer or collar 13 and project into the adjacent section ends. Obviously the washers 13 can be dispensed with and the cushions 14 made to abut directly against the shoulders 11, but I prefer to use the washers as these take off some of the wear on the cushions especially where a cable 15 is used to fasten the sections together and to tighten them.

The sections 10 can be fastened together so as to be gripped around the wheel felly in any convenient way, and I do not limit my invention to any particular means of doing this. A convenient means, however, is to use a cable 15 which extends longitudinally through the tire and through the several washers 13 and cushions 14, the ends of the cable connecting with screw bolts 16 which are provided with nuts 17, and these lie against abutments 13ᵃ in one of the sections 10. A hole or slot 18 is made in one of the sections 10 opposite the nut 17 so that a wrench can be inserted to turn the nuts, and by adjusting the nuts, the cable 15 can be shortened or lengthened and the necessary tension brought upon the sections 10 to hold them against the felly 21 of the wheel or to permit of their removal. To further provide for cushioning the tire, I preferably recess the inner sides of the sections 10 as shown at 19, and place cushions 20, preferably in the form of rubber blocks or tubes, behind the sections and in the recess 19, the said cushions resting in the outer face of the felly 21. It will be understood that this felly 21 can be of any desired shape and that the tire as I have described it, can be applied to any usual form of wheel.

From the foregoing description it will be seen that I provide a very simple wheel tire which can be readily assembled, and which when together can be easily applied to or removed from a wheel. Further that the sections are cushioned both longitudinally and radially, and in this way I get all the desired resilience. As the tire is not pneumatic, it needs no attention in the way of keeping it supplied with air, and as the sections are metallic, it will be seen that they will wear a long time. The tread surface of the sections can be left smooth or roughened, as desired.

I claim:

In combination with a wheel felly, a cushion tire comprising a series of segmental tubular sections adapted to act in conjunction with the felly, one of said tubular sections having a slot in its side wall, the said tubular sections having internal recesses at the ends thereof forming shoulders, cushioning members within the tubular sections, washers on the ends of the cushioning members engaging the shoulders of the tubular members, the distance between the shoulders of adjacent ends of the tubular sections being less than the length of the cushioning member and washers interposed between the said tubular sections, said tubular sections and washers being apertured, a tie extending through the apertures of the cushioning members and washers, said tie comprising a length of flexible material having threaded ends terminating in the tubular section containing the apertured side wall, and securing members applied to the ends of the tie for adjusting the tension of the tie and regulating the spaces between the said tubular sections.

AUGUST CASAZZA.

Witnesses:
 THOMAS T. SEELYE,
 ARTHUR G. DANNELL.

Copies of this patent may be obtained for five cents each, by addressing the "Commissioner of Patents, Washington, D. C."